March 2, 1926.
G. KOWARSKI
1,574,902
METHOD FOR THE MANUFACTURING OF WHEELS
Filed Feb. 29, 1924
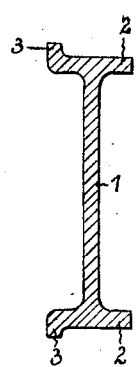
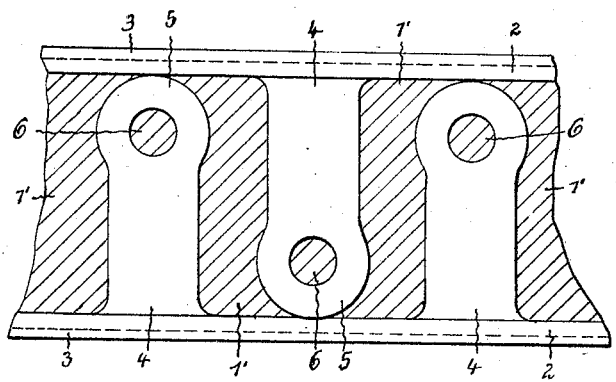
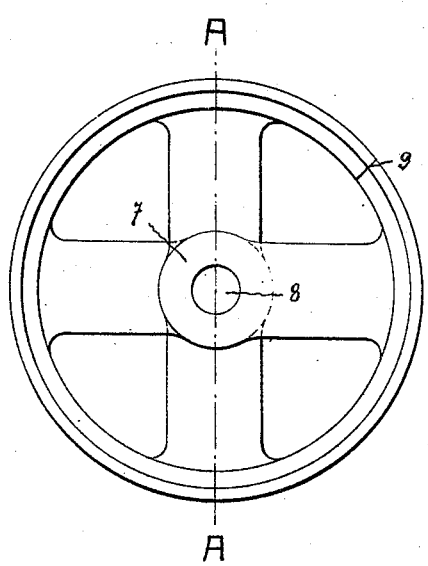
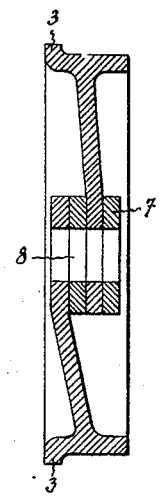
INVENTOR.
Gregor Kowarski,
BY Watson, Crit, Moser & Grindle,
ATTYS.

Patented Mar. 2, 1926.

1,574,902

UNITED STATES PATENT OFFICE.

GREGOR KOWARSKI, OF BERLIN, GERMANY.

METHOD FOR THE MANUFACTURING OF WHEELS.

Application filed February 29, 1924. Serial No. 696,080.

*To all whom it may concern:*

Be it known that I, GREGOR KOWARSKI, a citizen of the Republic of Lettland, residing at Berlin, Germany, have invented certain new and useful Improvements in Methods for the Manufacturing of Wheels, of which the following is a specification.

It is known to make wheels in such a manner that the spokes are cut out of the web of a profiled iron, the flange of which forms the wheel rim after the spokes have been brought into the radial position by the bending of the flange to circular shape, whereupon the free ends of the spokes are fixed in a hub which has been made separately.

According to the invention the wheel and the hub are made from a profiled iron, the spokes with lugs corresponding to the hub being cut out of the web of the profiled iron. By bending the work to circular shape and by bending the spokes off in lateral direction the lugs of the spokes are superposed so that, when they have been securely connected with one another, they form the hub. When the wheels are to have flanges at one side or at both sides the shape of a profiled iron has to be selected accordingly or the flanges of the profiled iron have to be submitted to a corresponding treatment.

An embodiment of the invention applied to the manufacturing of wheels for skips with unilateral wheel flange is illustrated by way of example, on the accompanying drawing, in which:

Fig. 1 shows an I-shaped profiled iron in cross section with unilateral wheel flange, the web having not yet been treated.

Fig. 2 shows in side elevation the profiled iron in the web of which the spokes for two wheels have been cut out in the well known manner.

Fig. 3 shows a finished wheel with four spokes in side elevation.

Fig. 4 is a section on line A—A of Fig. 3 from which the lateral bending of the spokes can be seen.

1 is the web of the profiled iron the flange 2 of which has at one side a bead 3 designed to form the wheel flange of the finished wheel. From the web 1 the spokes 4, each with a lug 5 at the free end, are cut out. The waste material 1' is indicated in Fig. 2 by hatched lines.

In order to reduce the loss of material to the minimum and to permit of making the blanks for two wheels at the same time, the spokes are cut out of the web so that, in the well known manner, one spoke with lug for the one wheel stands between two spokes of the other wheel. The lugs 5 have round eyes 6 and correspond with the cross section of the hub of the wheel to be produced.

After the spokes with the lugs have been cut for one wheel the works of the length required for one wheel are transformed into a circle by bending the flange. The spokes 4 adopt at this occasion a radial position, as shown in Fig. 3 and the lugs 5 are bent off in lateral direction and superposed so that, rigidly connected with one another, they form the hub 7 with bore 8 of a wheel. The joint 9 of the ends of the flange may be securely connected by welding or in any other convenient manner.

I claim:—

1. As an article of manufacture a one piece wheel formed from a profiled section having a web and a flange, in combination a rim formed from said flange, spokes extending radially inwardly from said rim formed from said web and a lug on the end of each spoke provided with a transverse opening, said spokes being offset so that the lugs overlap with the openings in alignment to thus form a hub.

2. As an article of manufacture, a one piece vehicle wheel formed from a profiled section having a web and a flange, including in combination, a circular rim formed by bending said flange, spokes extending radially inward from said rim formed from said web and each having an enlarged perforated end, said spokes being offset inwardly of said rim so that the ends overlap to form a hub, said perforations being aligned to receive an axle.

In testimony whereof I affix my signature.

GREGOR KOWARSKI.